(12) United States Patent
Baltimore et al.

(10) Patent No.: US 10,221,101 B2
(45) Date of Patent: Mar. 5, 2019

(54) METHOD FOR SELF-CONSOLIDATING GROUT

(71) Applicant: Cal Poly Corporation, San Luis Obispo, CA (US)

(72) Inventors: Craig V Baltimore, Los Osos, CA (US); James Mwangi, Paso Robles, CA (US); Kurt Siggard, Sacramento, CA (US)

( * ) Notice: Subject to any disclaimer, the term of this patent is extended or adjusted under 35 U.S.C. 154(b) by 92 days.

(21) Appl. No.: 14/999,767

(22) Filed: Jun. 24, 2016

(65) Prior Publication Data

US 2017/0369377 A1    Dec. 28, 2017

(51) Int. Cl.
| | | |
|---|---|---|
| *C04B 28/18* | (2006.01) | |
| *C04B 28/08* | (2006.01) | |
| *C04B 14/04* | (2006.01) | |
| *C04B 14/06* | (2006.01) | |
| *C04B 111/70* | (2006.01) | |
| *C04B 111/00* | (2006.01) | |
| *C04B 111/10* | (2006.01) | |

(52) U.S. Cl.
CPC .............. *C04B 28/18* (2013.01); *C04B 14/04* (2013.01); *C04B 14/06* (2013.01); *C04B 28/08* (2013.01); *C04B 2111/00103* (2013.01); *C04B 2111/10* (2013.01); *C04B 2111/70* (2013.01)

(58) Field of Classification Search
CPC ......... C04B 28/18; C04B 28/08; C04B 14/04; C04B 14/16; C04B 2111/70; C04B 2111/00103; C04B 2111/10
See application file for complete search history.

(56) References Cited

U.S. PATENT DOCUMENTS

| | | | | |
|---|---|---|---|---|
| 2015/0144031 A1* | 5/2015 | Ciuperca | ................. | C04B 28/04 106/709 |
| 2015/0315078 A1* | 11/2015 | Feldman | ............... | C04B 14/102 106/706 |
| 2016/0075852 A1* | 3/2016 | Lai | ........................ | C04B 28/082 524/2 |

OTHER PUBLICATIONS

PCT/US2017/038919 International Search Report and Written Opinion dated Sep. 22, 2017.
Fonseca Fernando S et. al, "Compressive Strength of Masonry Grout Containing High Amounts of Class F Fly Ash and Ground Granulated Blast Furnace Slag", Construction and Building Materials, vol. 94, Jul. 18, 2015 (Jul. 18, 2015) pp. 719-727, XP029252464, ISSN: 0950-0618, DOI: 10.1016/J.CONBUILDMAT.2015.07.115.
James P. Mwangi et. al, "Performance of No Vibration/No Admixture Masonry Grout Containing High Replacement of Portland Cement With Fly Ash and Ground Granulated Blast Furnace Slag", 12th Canadian Masonry Symposium, Vancouver, British Columbia, Jun. 2-5, 2013, Jun. 5, 2013 (Jun. 5, 2013), pp. 1-15, XP55404092.
N. Bouzoubaa et. al, "Self-Compacting Concrete Incorporating High Volumes of Class F Fly Ash Preliminary Results", Cement and Concrete Research, vol. 31, No. 3, Jan. 1, 2001 (Jan. 1, 2001), pp. 413-420, XP055404672.
Ferando S. Conseca, Strength of Concrete Masonry Prisms Constructed with Non-Tradional Grout and Type M,S and N Mortars, A Final Report for NCMA Education Research Fund, Brigham Young University, Jul. 2012.
Brice Emerson Sommers, Evaluation of the Compressive Strength of Masonry Prisms Filled with High Volume Mineral Admixture Grout Constructed with Type N Mortar, Masters Thesis, Brigham Young University, Dec. 2012.
Juan Manuel Salguero Mendizabal, Compressive Strength of Masonry Prisms Made with Mortar Type S and Variable Grout Mixes, Masters Thesis, Brigham Young University, Dec. 2011.
Fernando S. Conseca and Kurt Siggard, High Volume Fly Ash Masonry Grout, Structure Magazine, May 2012.
James P. Mwangi, Craig V. Baltimore, and Eric W. Bateman, Performance of No Vibration, No Admixture Masonry Grout Containing High Replacement of Portland Cement with Fly Ash and Ground Granulated Blast Furnace Slag, 12th Canadian Masonry Symposium, Jun. 2013.
Craig V. Baltimore, James P. Mwangi, Eric W. Bateman, No Admixture, Self Consolidating Grout, 9th International Masonry Conference, Guimaraes 2014.

* cited by examiner

*Primary Examiner* — Anthony J Green

(57) ABSTRACT

Compositions and a method for making self consolidating grouts containing fly ash, ground granulated blast furnace slag, and lime are described. No polymeric admixtures are utilized, and the 28 day cure strength of the cured gouts exceeds the minimum ASTM standards. The uncured grout exhibits slump flows between 24 and 30" without visible segregation of the components.

17 Claims, 1 Drawing Sheet

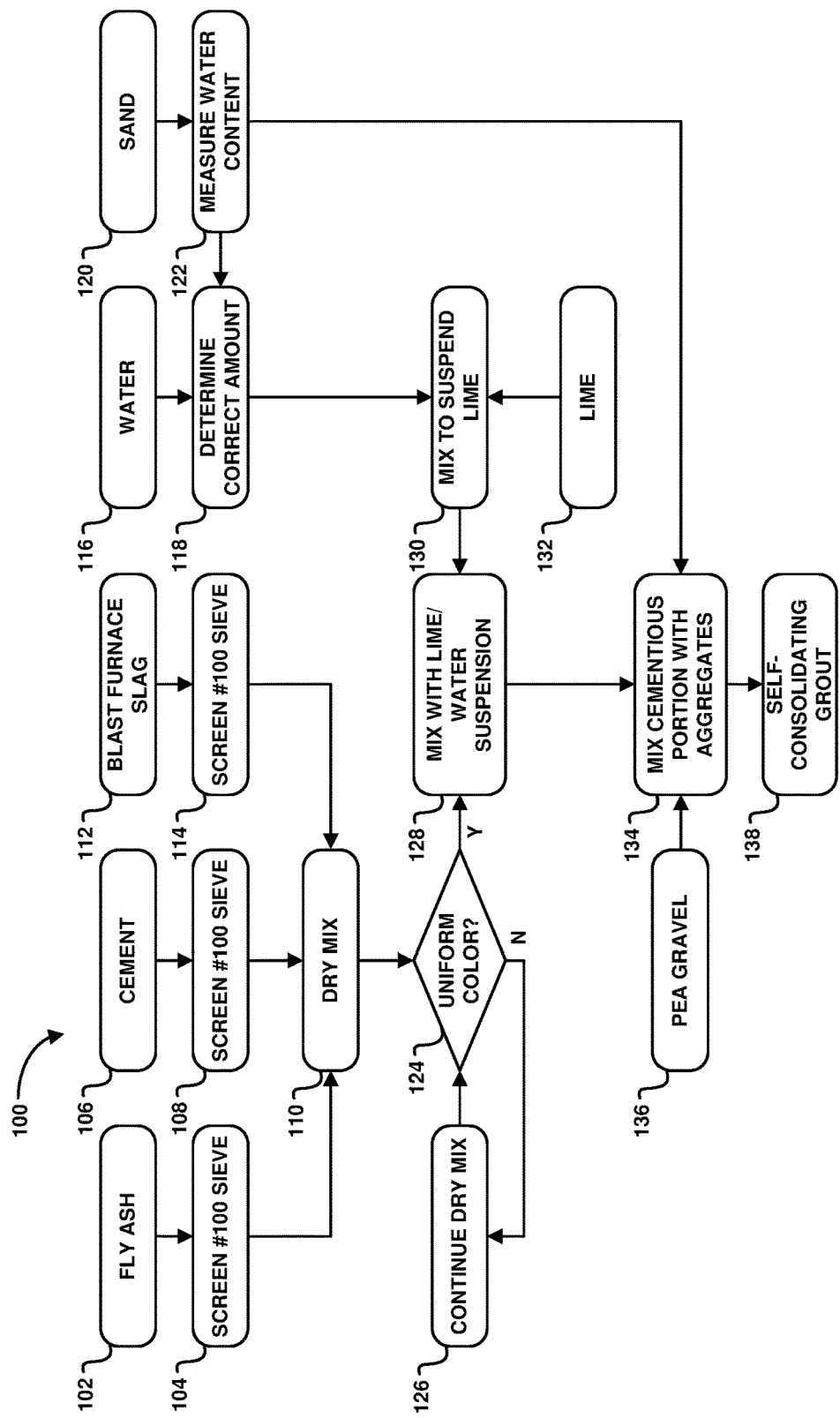

METHOD FOR SELF-CONSOLIDATING GROUT

BACKGROUND OF THE INVENTION

The invention relates to the design and process for making cementitious grouts. More specifically, the invention relates to compositions and methods for making self-consolidating grouts containing fly ash and ground granulated blast furnace slag.

Grout is a cementitious material used to fill voids and volumes in the construction of masonry structures. It differs from concrete mixtures in that the aggregates are considerably finer in particle size which allows it to flow into finer passages such as, for example, the internal volumes of a typical 8"×8"×16" concrete masonry block (CMU). Grout mixtures can be divided in two basic functional groups; conventional (non-consolidating) grout and self-consolidating grout.

Conventional (non-consolidating) grout has been the default material used for many years. It has a relatively high viscosity (compared to self consolidating types), characterized by "slump" measurements of between 8" and 11", per ASTM C 476. Slump is measured by filling an inverted hollow cone with grout, then pulling the cone, allowing the grout mixture to "fall", creating a collapsed mass. The difference in height between the original cone height and the top of the collapsed mass of grout is the "slump". Compared to concrete, conventional grout has a higher (falls more) slump because it must flow into passages and around objects (like reinforcing bar) that concrete cannot. However, to insure complete penetration of grout into passages and around objects, and to minimize voids, conventional grouts must have mechanical vibration applied during filling. This can be time consuming and expensive. Due to the limited flow-ability of conventional grout, the maximum length of any given fill is limited, so grout filling must be accomplished in stages with vibration applied in each stage.

Conventional non-consolidating grout is typically comprised of Portland cement or cement mixtures and an aggregate. Aggregates typically comprise sand or sand and pea gravel mixtures, in accordance with ASTM C 476. Chemical "admixtures" may be added to modify properties. Since Portland cement is energy intensive to manufacture and somewhat expensive, there has been an effort by researchers to substitute components like fly ash and blast furnace slag for a portion of the cement. Typically, however, these materials reduce the compressive strength of the grout, or extend the time period it takes to achieve the minimum strength of 2000 psi specified by ASTM C 476.

Self-consolidating grouts are more recent mixtures having better flow characteristics than conventional non-consolidating grout. Typically, they do not require vibration to flow into passages, around re-bar and have reduced void formation. Due to the reduced effective viscosity of self-consolidating grouts, their flow properties are not measured by conventional "slump" testing, as described above. Instead, "slump flow" is used, which is the diameter of a reference sample volume after being poured onto a flat surface. The larger the diameter, the more fluid the sample is and the greater the "slump flow". Due to the increased fluidity, there is concern about segregation of the components and aggregate, which is undesirable. So, these grouts contain various chemical compounds to suspend aggregates and other components in a uniform manner. These compounds are often referred to as "admixtures", and typically take the form of polycarboxylates or related compounds. Polycarboxylates act as a suspending and fluidizing agents, which also reduce the amount of water required in the mixtures. To further improve flow characteristics, other viscosity modifying compounds may also be added. The potential disadvantage of these self-consolidating mixtures is cost. Although they save money during the pouring and filling stages, they still contain Portland cement for the most part, with the addition of expensive hydrocarbon based admixtures.

Recently, researchers have been reporting on the composition of self-consolidating grouts that contain significant portions of fly ash and ground granulated blast furnace slag, without the addition of admixtures. For example, Mwangi et al. reported on the performance of self consolidating grout mixtures containing fly ash and ground granulated blast furnace slag in a paper presented to the $12^{th}$ Canadian Masonry Symposium, June 2013. Although the 28 day compressive strengths of the cured grout were just shy of the minimum required 2000 psi, the results showed great promise. These newer self-consolidating grouts have the potential for significant cost reduction and overall energy savings, by reducing Portland cement content and eliminating the need for hydrocarbon admixtures. They also provide a sustainability improvement by the incorporation of fly ash and blast furnace slag, materials that would have otherwise needed disposal in land fills.

These and other limitations of the prior art will become apparent to those of skill in the art upon a reading of the following descriptions and a study of the several figures of the drawing.

SUMMARY OF THE INVENTION

It is an object of the present invention to provide a self-consolidating grout mixture free of polymeric admixtures, containing a cementitious portion comprising a first portion of cement, a second portion of fly ash, a third portion of ground granulated blast furnace slag, and a fourth portion of hydrated lime; an aggregate portion comprising a fifth portion of dry aggregates and a sixth portion of adsorbed water; and a free water portion added to the cementitious portion and the aggregate portion to complete the self-consolidating grout mixture, wherein the total water content of the self consolidating grout mixture contains the free water portion and the adsorbed water in the aggregate.

It is another object of the present invention to provide a method for making a self-consolidating grout mixture free of polymeric admixtures, having the steps of (1) dry mixing components within a cementitious portion of the self-consolidating grout mixture, the components containing a first portion of cement, a second portion of fly ash, and a third portion of ground granulated blast furnace slag; (2) providing a fourth portion of hydrated lime; (3) determining the water content within the aggregate portion, the aggregate portion to be added to the self-consolidating grout mixture; (4) determining the free water content by subtracting the water content within the aggregate portion from the combined weight of the first portion of cement, the second portion of fly ash, the third portion of ground granulated blast furnace slag, and the fourth portion of hydrated lime; (5) blending the free water content with the fourth portion of hydrated lime to form a hydrated lime suspension; (6) adding the hydrated lime suspension to the dry mixed components of the cementitious portion to form a cementitious paste; (7) mixing the cementitious paste with the aggregate portion to complete formulation of the self-consolidating grout mixture.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures:

The FIGURE is block diagram of a process for making self-consolidating grout containing fly ash and blast furnace slag, in accordance with an example embodiment of the present invention.

DETAILED DESCRIPTION OF THE PREFERRED EMBODIMENTS

It is an object of the present invention to provide compositions and methods for making self consolidating grouts containing fly ash, ground granulated blast furnace slag, without polymeric admixtures, that provide improved cure strengths over those reported in the prior art. As will be appreciated by those skilled in the art, the properties of the final grout mixture are sensitive to the specific process for combining and mixing the ingredients, as well as the actual chemical composition of the mixture.

The self consolidating grout mixture examples of the present invention are comprised of three main groups of materials. They are (1) Cementitious Materials, (2) Aggregates, and (3) Water. The Cementitious Group comprises (a) cement, (b) Fly Ash, (c) Ground Granulated Blast Furnace Slag (GGBS), and (d) Lime. The Aggregates Group comprises (a) Masonry Sand, and (b) Pea Gravel. The Water Group comprises potable water. Note that any water present in any component of another group must be included in the total water allocated for the mixture. This is particularly the case for masonry sand, which may contain a significant proportion of water. The weights reported in this disclosure for each component are for a water free (anhydrous) material.

With respect to the Cementitious Group of an example embodiment of the present invention, the cement is Portland Cement, Types II or V, complying with ASTM C 150. The Fly Ash is preferably Class F, in accordance with ASTM C 270. Although there are other fly ash classes available, such as class N and class C, they have been found to be unsuitable for use in example embodiments of the present invention. Class N is unregulated, and class C may create grouts that harden prematurely, shortening the working time unsuitably for applications in construction. The ground granulated blast furnace slag can be grade 100 or 120, preferably Grade 120. The lime component is hydrated lime, $Ca(OH)_2$.

In an example embodiment of the present invention, the cement composition is between 6 to 7 wt % (of the total grout mixture); preferably 6.1 to 6.2 wt %. Fly ash composition is between 3 to 4 wt %, preferably between 3.7 to 3.8 wt %. Ground granulated blast furnace slag composition is between 6 to 7 wt %, preferably between 6.6 to 6.7 wt %. Lime composition is between 0.5 and 0.6 wt %, preferably between 0.5 and 0.53 wt %.

With respect to the Aggregate Group of an example embodiment of the present invention, the masonry sand component comprises between 45 and 46 wt % on a dry basis, as mentioned above. If the sand contains water, the water content needs to be measured and subtracted from the total allocation of water needed for the total grout mixture. The pea gravel component comprises between 20 and 21 wt % of the mixture. The ratio of fine aggregate (masonry sand) to cementitious material is approximately 2.7, which is within the to specified range cited in ASTM 476 of 2.25 to 3.0. The ratio of coarse aggregate (pea gravel) to cementitious material is approximately 1.2, which is within the range cited in ASTM 476 of 1.0 to 2.0.

The amount of water in example embodiments of the present invention is critical to the performance and cured properties of the grout. Too much water and the mixture is too fluid which results in separation and segregation of the components. Too much water may also reduce the cured strength. Too little water and the flow properties of the uncured grout can be compromised, resulting in incomplete filling of voids and bridging. In conventional self-consolidating grouts of the prior art, water composition is balanced or augmented with the use of polymeric admixtures, which aid in suspension of solids and improve fluidity of the grout mixture. When polymeric admixtures are replaced with fly ash and blast furnace slag, water content becomes much more critical. As such, total water content must be considered, including any water contained within the aggregates. The example embodiments of the present invention specify the total water content to total cementitious components weight ratio at between 0.97 and 1.0.

For example, a self consolidating grout batch of 87.5 lbs containing 5.4 lbs cement, 3.3 lbs fly ash, 5.8 lbs blast furnace slag, 0.46 lbs hydrated lime, 40 lbs masonry sand (dry weight basis), 18 lbs pea gravel, and 14.5 lbs total water was formulated and cast into prisms approximately 3" by 3" by 6" in dimension. The seven day strength (corrected for geometric factors in accordance with ASTM C 1314) averaged 1504 psi. The 28 day strengths averaged 2381 psi, which exceeds the minimum required by ASTM specification. Slump flow of the uncured grout measured between 24 and 30", with no evidence of component separation of segregation While the composition of components has an important bearing on grout performance, it is well known by those skilled in the art that the process for combining components will also have a significant impact. It is known that two grouts, each having the same overall composition, may indeed have different flow properties and cure strength due to different methods of combining and mixing the ingredients. The order within which ingredients are combined, the particle sizes, and thoroughness of the mixing process all have an impact on final grout performance, which includes flow properties as well as 28 day and final cure strength.

The FIGURE is block diagram 100 of a process for making self-consolidating grout containing fly ash and blast furnace slag, in accordance with an example embodiment of the present invention. The process begins at steps 102, 106, and 112 wherein fly ash (102), cement (106), and ground granulated blast furnace slag (112) are sieved in #100 screens, the product passing through the screens in steps 104, 108, and 114 is sent to mixing step 110 were the components are combined and dry mixed. The dry mixing of step 110 is carried out until the mixture is of uniform color, typically a greenish hue, darker in color than the fly ash or cement, but lighter than the blast furnace slag. As an example, color will range from a color pallet of Red 143, Green 143, Blue 141 to Red 160, Green 166, Blue 163. The mixture will be free flowing without clumps and have a "plastic flow" appearance. In step 124 the mixture is checked for uniformity in color. Mixing is continued in step 126 if required until fully mixed, at which point the process continues to step 128.

Potable (free) water is provided for the process in step 116. However, the precise amount must be determined by subtraction of any water content native (adsorbed) in the masonry sand supplied to the process in step 120. In step 122 the adsorbed water content of the sand is determined and used to compute the proper amount of free water in step 118. As an example, if 14.5 lbs of total water are required for a given batch, and the sand contains 1.5 lbs of water, the net free water to be added will be 13 lbs. After the determination of the correct free water to be added in step 118, the free water is combined with the hydrated lime (provided in step 132) in step 130. Hydrated lime and water are mixed in step 130 in such manner as to suspend the $Ca(OH)_2$ particles in the water as an emulsion. Continuous mixing may be required to maintain the suspension.

The water/lime suspension is added to the cementitious mix from step 124 in step 128. The water/lime suspension is added in allotments between 10 wt % and 33 wt % at a time, thoroughly mixing the paste after the addition of each allotment. Continuous mixing of the water/lime suspension may be required to maintain a uniform suspension before and after each allotment is added to the grout mix. After all the water/lime suspension from step 130 is added, and the cementitious mixture is fully mixed and uniform in step 128, the cementitious mix is combined with the pea gravel supplied in step 136 and the sand from step 120, in step 134. Note that any water contained in the sand enters the mix at this stage in step 134.

After thorough mixing in step 134 to a point where no segregation of components is visible and the color is uniform, the grout is ready for use in step 138.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A self-consolidating grout mixture free of polymeric admixtures, comprising:
   a cementitious portion, said cementitious portion comprising a first portion of cement, a second portion of fly ash, a third portion of ground granulated blast furnace slag, and a fourth portion of hydrated lime;
   an aggregate portion, said aggregate portion comprising a fifth portion of dry aggregates and a sixth portion of adsorbed water; and
   a free water portion, said free water portion added to said cementitious portion and said aggregate portion to complete said self-consolidating grout mixture,
   wherein a total water content of said self-consolidating grout mixture comprises said free water portion and said sixth portion of adsorbed water in said aggregate portion and wherein a weight of said total water content is approximately equal to a weight of said cementitious portion of said self-consolidating grout mixture.

2. The grout mixture as recited in claim 1, wherein said aggregate portion comprises pea gravel and masonry sand.

3. The grout mixture as recited in claim 2, wherein said sixth portion of adsorbed water is primarily contained within said masonry sand.

4. The grout mixture as recited in claim 1, wherein said second portion of fly ash comprises Class F fly ash, said second portion of fly ash having a weight between 3 and 4 wt % of said self-consolidating grout mixture.

5. The grout mixture as recited in claim 1, wherein said first portion of cement weighs between 6 and 7 wt % of said self-consolidating grout mixture.

6. The grout mixture as recited in claim 1, wherein said third portion of ground granulated blast furnace slag weighs between 6 and 7 wt % of said self-consolidating grout mixture.

7. The grout mixture as recited in claim 1, wherein said fourth portion of hydrated lime weighs between 0.5 and 0.6 wt % of said self-consolidating grout mixture.

8. The grout mixture as recited in claim 1, wherein a strength of said self-consolidated grout mixture after 28 days cure time is greater than 2000.

9. A method for making a self-consolidating grout mixture free of polymeric admixtures, comprising:
   dry mixing components within a cementitious portion of said self-consolidating grout mixture, said components comprising a first portion of cement, a second portion of fly ash, and a third portion of ground granulated blast furnace slag;
   providing a fourth portion of hydrated lime;
   determining a sixth portion of adsorbed water included within an aggregate portion, said aggregate portion including a fifth portion of dry aggregates, said aggregate portion to be added to said self-consolidating grout mixture;
   determining a free water portion by subtracting said free water portion within said aggregate portion from a combined weight of said first portion of cement, said second portion of fly ash, said third portion of ground granulated blast furnace slag, and said fourth portion of hydrated lime;
   blending said free water content with said fourth portion of hydrated lime to form a hydrated lime suspension;
   adding said hydrated lime suspension to said dry mixed components of said cementitious portion to form a cementitious paste; and
   mixing said cementitious paste with said aggregate portion to complete formulation of said self-consolidating grout mixture, wherein a total water content of said self-consolidating grout mixture comprises said free water portion and said sixth portion of adsorbed water in said aggregate portion and wherein a weight of said total water content is approximately equal to a weight of said cementitious portion of said self-consolidating grout mixture.

10. The method as recited in claim 9, wherein said first portion of cement, said second portion of fly ash, and said third portion of ground granulated blast furnace slag are each screened through #100 size sieves prior to dry mixing said cementitious portion of said self-consolidating grout mixture.

11. The method as recited in claim 10, wherein dry mixing of said cementitious portion of said self-consolidating grout mixture is completed when a uniform color of mixed solids is achieved.

12. The method as recited in claim 9, wherein said hydrated lime suspension is added in a plurality of allocations, addition of each of said plurality of allocations being followed by mixing of said cementitious paste, each of said plurality of allocations comprising between 10 and 33 wt% of said hydrated lime suspension.

13. The method as recited in claim 9, wherein said aggregate portion comprises pea gravel and masonry sand, said pea gravel comprising between 20 and 21 wt% of said self-consolidating grout mixture, and said masonry sand comprises between 45 and 46 wt% on a dry basis.

14. The method as recited in claim 9, wherein said first portion of cement comprises between 6 and 7 wt% of said self-consolidating grout mixture.

15. The method as recited in claim 9, wherein said second portion of fly ash comprises Class F fly ash weighing between 3 and 4 wt% of said self-consolidating grout mixture.

16. The method as recited in claim 9, wherein said third portion of ground granulated blast furnace slag comprises between 6 and 7 wt% of said self-consolidating grout mixture.

17. The method as recited in claim 9, wherein said fourth portion of hydrated lime comprises between 0.5 and 0.6 wt% of said self-consolidating grout mixture.

* * * * *